United States Patent
Nuaimi et al.

(10) Patent No.: US 9,444,903 B2
(45) Date of Patent: Sep. 13, 2016

(54) PROXY BASED NETWORK COMMUNICATIONS

(75) Inventors: Athir Nuaimi, Toronto (CA); Chris Houston, Toronto (CA); Kenneth Rose, Toronto (CA); Austin Ziegler, Toronto (CA)

(73) Assignee: SURFEASY INC., Toronto (CA)

( * ) Notice: Subject to any disclaimer, the term of this patent is extended or adjusted under 35 U.S.C. 154(b) by 534 days.

(21) Appl. No.: 14/123,221

(22) PCT Filed: Jun. 4, 2012

(86) PCT No.: PCT/CA2012/000539
§ 371 (c)(1),
(2), (4) Date: Dec. 1, 2013

(87) PCT Pub. No.: WO2012/162815
PCT Pub. Date: Dec. 6, 2012

(65) Prior Publication Data
US 2014/0122580 A1    May 1, 2014

Related U.S. Application Data

(60) Provisional application No. 61/492,552, filed on Jun. 2, 2011, provisional application No. 61/607,535, filed on Mar. 6, 2012.

(51) Int. Cl.
*G06F 15/16* (2006.01)
*H04L 29/08* (2006.01)
(Continued)

(52) U.S. Cl.
CPC ........... *H04L 67/28* (2013.01); *H04L 63/0281* (2013.01); *H04L 63/102* (2013.01);
(Continued)

(58) Field of Classification Search
CPC ...................................................... H04L 29/08
USPC ........................................................ 709/203
See application file for complete search history.

(56) References Cited

U.S. PATENT DOCUMENTS 5,961,593 A    10/1999 Gabber et al.
6,049,821 A *  4/2000 Theriault .......... G06F 17/30905
                                                707/E17.121
(Continued)

FOREIGN PATENT DOCUMENTS

| CA | 2434521 A1 | 8/2002 |
| EP | 1933532 A2 | 6/2008 |
| EP | 2288082 A1 | 2/2011 |

OTHER PUBLICATIONS

ISA/CA—Canadian Intellectual Property Office; PCT International Search Report; Sep. 19, 2012; pp. 1-3; Canada.
(Continued)

*Primary Examiner* — Anthony Mejia
(74) *Attorney, Agent, or Firm* — Michael J. Andri

(57) ABSTRACT

The present invention is a proxy based network communication system and method that incorporates one or more proxy servers that may be non-static, dynamic proxy servers, operable to automatically identify aspects of a user's network environment and details of the servers in said network and to set-up and configure software to be utilized by a user without user input of details of the user's network environment. These operations of the present invention may be undertaken at a point of user setup and reinitiated upon recognition of a communication problem, The present invention may further be operable to allow a user to access only the part of the network to which the user requires access, and to prevent the user from accessing other parts of the network. The present invention therefore provides a secure environment by implementing changing proxy servers rather than static proxy servers and restricting user access within the network on a need-for-access basis.

20 Claims, 8 Drawing Sheets

(51) Int. Cl.
*H04L 29/06* (2006.01)
*H04L 12/24* (2006.01)

(52) U.S. Cl.
CPC ........... *H04L 67/2819* (2013.01); *H04L 67/34* (2013.01); *H04L 41/0806* (2013.01); *H04L 41/0886* (2013.01); *H04L 63/083* (2013.01); *H04L 63/166* (2013.01); *H04L 2463/082* (2013.01)

(56) References Cited

U.S. PATENT DOCUMENTS

| | | |
|---|---|---|
| 6,442,687 B1 | 8/2002 | Savage |
| 6,567,857 B1 * | 5/2003 | Gupta ................. H04L 67/2804 370/235 |
| 9,363,327 B2 * | 6/2016 | Kohli ..................... H04L 69/16 |
| 2002/0103850 A1 | 8/2002 | Moyer et al. |
| 2002/0157019 A1 * | 10/2002 | Kadyk ................ H04L 63/0281 726/4 |
| 2002/0162009 A1 | 10/2002 | Shmueli et al. |
| 2004/0025019 A1 * | 2/2004 | Watanabe .............. H04L 9/3013 713/168 |
| 2005/0021668 A1 | 1/2005 | Beesley et al. |
| 2005/0050352 A1 | 3/2005 | Narayanaswami et al. |
| 2005/0160161 A1 * | 7/2005 | Barrett .................... H04L 63/20 709/223 |
| 2007/0006290 A1 | 1/2007 | Li |
| 2007/0078734 A1 * | 4/2007 | Oren .................... G06Q 20/102 705/26.1 |
| 2009/0319782 A1 | 12/2009 | Lee |
| 2011/0125833 A1 | 5/2011 | Persson et al. |
| 2011/0154135 A1 | 6/2011 | Tyhurst et al. |
| 2014/0122580 A1 * | 5/2014 | Nuaimi ................... H04L 67/28 709/203 |

OTHER PUBLICATIONS

ISA/CA—Canadian Intellectual Property Office; Written Opinion of the International Searching Authority; Oct. 9, 2012; pp. 1-5; Canada.

The International Bureau of WIPO; International Preliminary Report on Patentability; Dec. 2, 2013; pp. 1-6; Switzerland.

* cited by examiner

PROXY BASED NETWORK COMMUNICATIONS

FIELD OF INVENTION

This invention relates in general to the field of proxy server communication and more particularly to non-static proxy server communication.

BACKGROUND

In prior art computer networks, communications may be directed through a proxy server that is operable to act as an intermediary and to process requests from client devices that are seeking resources from other servers. For example, a client device may connect to a proxy server and submit a request for a network resource. The network resource that is requested may be a file, a service, a connection, a web page, or any other suitable network resource that is available from a resource server. A proxy server may provide a network resource to a client device by connecting to a relevant resource server and requesting the network resource on behalf of the client device. Generally such prior art proxy servers are static proxy servers. Prior art servers also generally require users to provide their own software and to configure such software themselves.

Some prior art proxy servers may store network resources. Such proxy servers may serve requests to client devices in response to some or all of the client requests without contacting the specified resource server. Some prior art proxy servers may also alter a request received from a client device and/or a response received from a resource server. For example, a proxy server may anonymize network communications of a client device before forwarding the request to a resource server.

U.S. Patent Application Publication No. 2001/0154135 discloses a system, method and apparatus wherein a query is directed to a proxy server rather than a public server enabled as a gateway for software downloads. This invention is directed to installing software at a mobile electronic device so that approved software can be selected for installation on the mobile electronic device. This invention is not directed to a system or method operable to automatically identify aspects of a user's network environment and details of the servers in said network and to set-up and configure software to be utilized by a user without user input of details of the user's network environment.

U.S. Patent Application Publication No. 2011/0125833 discloses methods and preprocessing proxy server in a communication system that can support modes of web browser operation and enable a user selectively to bypass or enable the proxy server's translation of requested web content. The decision as to whether a translation is to be performed is undertaken by a proxy server in the network. This invention is directed to translation and not to the subject matter of the present invention.

SUMMARY OF THE INVENTION in one aspect, the present disclosure relates to a proxy based network communication system, characterized in that it comprises: a client device; one or more proxy servers; an intermediate device operable to communicate bi-laterally with the client device and the one or more proxy servers, said intermediate device being operable to monitor communications between the client device and the one or more proxy servers; and a communication device operable to communication hi-laterally with the client device and the intermediate device, said communication device having instructions stored therein; whereby the client device is operable to utilize instructions stored in the communication device to automatically identify aspects of the one or more proxy servers and to set-up and configure software to be utilized by a user.

Said network communication system of the present invention may further be characterized in that the communication device is any of the following: a portable storage device, that is any of the following: a mass storage device, a USB mass storage device, and a mobile computing device that incorporates a processor for executing instructions; and a network gateway device, that is any of the following: a network router, a computing device, a personal computer, mobile device, video gaming console, cable television box, or other computing device.

Said network communication system of the present invention may further be characterized in that the automatic identification of aspects of the one or more proxy servers and the set-up and configuration or software to be utilized by the user occurs at any of the following: at a point of user setup; upon recognition of a communication problem; at a timed interval; and upon the occurrence of a particular activity.

Said network communication system of the present invention may further be characterized in that the system is operable to allow the user to access only part of the network and to prevent the user from accessing other parts of the network.

Said network communication system of the present invention may further be characterized in that the one or more proxy servers are non-static dynamic proxy servers.

Said network communication system of the present invention may further be characterized in that a resource server is operable to communicate bi-laterally with the proxy server and to provide one or more network resources to the one or more proxy servers.

Said network communication system of the present invention may further be characterized in that a configuration and coordination server is operable to communicate bi-laterally with the intermediate device and the one or more proxy servers, said configuration and coordination server being operable to identify proxy addresses for use by the client device and to configure the one or more proxy servers.

Said network communication system of the present invention may further be characterized in that the client device incorporates any of the following: a set of proxy addresses; selection parameters to be applied by the selection algorithm; session information, for example, such as cookies, browsing history, bookmarks, or any other session information; a browser program; and other software components to enable proxy selection and proxy based network communications.

Said network communication system of the present invention may further be characterized in that the intermediate device and the one or more proxy servers are connected via a wide area network.

Said network communication system of the present invention may further be characterized in that a browser application and one or more software components may be incorporated in any of the following: the client device; and the communication device.

A method of proxy based network communication, characterized in that said method comprises the following steps: connecting a communication device to a client device; automatically launching a browser program operable on the client device from the communication device; storing session information from the client device in the communication device; closing browser program on client device in response to satisfaction of termination conditions; and the client device and communication device communicating with one or more proxy servers via an intermediate device.

Said method of proxy based network communication of the present invention may further be characterized in that said method further comprises the following step, the intermediate device communicating with the one or more proxy servers via a wide area network.

Said method of proxy based network communication of the present invention may be characterized in that said method further comprises the following steps: obtaining a set of one or more proxy addresses; the client device generating a request message to request one or more network resources; applying a selection means for selecting a selected proxy addresses from the set of one or more proxy addresses: the client device sending the request message to a selected proxy server residing at the selected proxy address via the intermediate device; the selected proxy server sending a proxy request message to a network resource server to request a network resource; the selected proxy server receiving a proxy response message that incorporates the network resource in response to the proxy request message; the proxy server sending a response message that incorporates the network resource to the client device via the intermediate server; the client device receiving and processing the response message.

Said method of proxy based network communication of the present invention may be characterized in that said method further comprises the following step, re-selecting another of the one or more proxy servers by repeating the steps of claim 13 if any of the following occurs: upon recognition of a communication problem; at a timed interval; and upon the occurrence of a particular activity.

Said method of proxy based network communication of the present invention may be characterized in that said method further comprises the following steps: the client device selecting a selected proxy server from the one or more proxy servers; the selected proxy server receiving an authentication message from the client device via the intermediate server; authenticating the client device utilizing the authentication message; the selected proxy server sending an encrypted message that includes a set of one or more proxy addresses and one or more selection parameters to the client device via the intermediate server; the selected proxy server receiving an indication of an update to any of the following: the set of one or more proxy addresses; and the one or more selection parameters; in response to the indication creating an updated set so that: if the indication is an update to the set of one or more proxy addresses, the proxy server updating the set of one or more proxy addresses to create the updated set; and if the indication is an update to the one or more selection parameters, the proxy server updating the one or more selection parameters to create the updated set; the proxy server sending the updated set to the client device.

Said method of proxy based network communication of the present invention may be characterized in that said method further comprises the following step, re-authenticating the selected proxy server by repeating the steps of claim 15 if any of the following occurs: upon recognition of a communication problem; at a timed interval; and upon the occurrence of a particular activity.

Said method of proxy based network communication of the present invention may be characterized in that said method further comprises the following steps: the client device selecting a selected proxy server from the one or more proxy servers; the client device receiving input indicating any of the following as location data: a location indicator; and a location specificity value; the client device sending the location data to the selected proxy server via the intermediate server; the client device generating a search query message in response to user search query input; the client device sending the search query message to the selected proxy server via the intermediate server; the selected proxy server obtaining location information associated with client device by utilizing the location data; the selected proxy server modifying the search query message to include the location information to produce a modified search query message; the proxy server sending the modified search query message to a network server hosting a search service; the network server sending a response message that incorporates search results in response to the modified search query message to the selected proxy server; and the selected proxy server forwarding the response message to the client device via the intermediate server.

Said method of proxy based network communication of the present invention may be characterized in that said method further comprises the following steps: selection a proxy server from the one or more proxy servers as a selected proxy server; retrieving session information from communication device; and applying session information at the selected proxy server during a subsequent session and sending session information to client device for use by browser.

Said method of proxy based network communication of the present invention may be characterized in that said method further comprises the following step of limiting the proxy based communication network accessible by a user to be part of the proxy based communication network.

Said method of proxy based network communication of the present invention may be characterized in that said method further comprises the following step of encrypting communications between the client device and any of the one or more proxy servers.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

BRIEF DESCRIPTION OF DRAWINGS

The invention will be better understood and objects of the invention will become apparent when consideration is given to the following detailed description thereof. Such description makes reference to the annexed drawings wherein.

Figure 1:
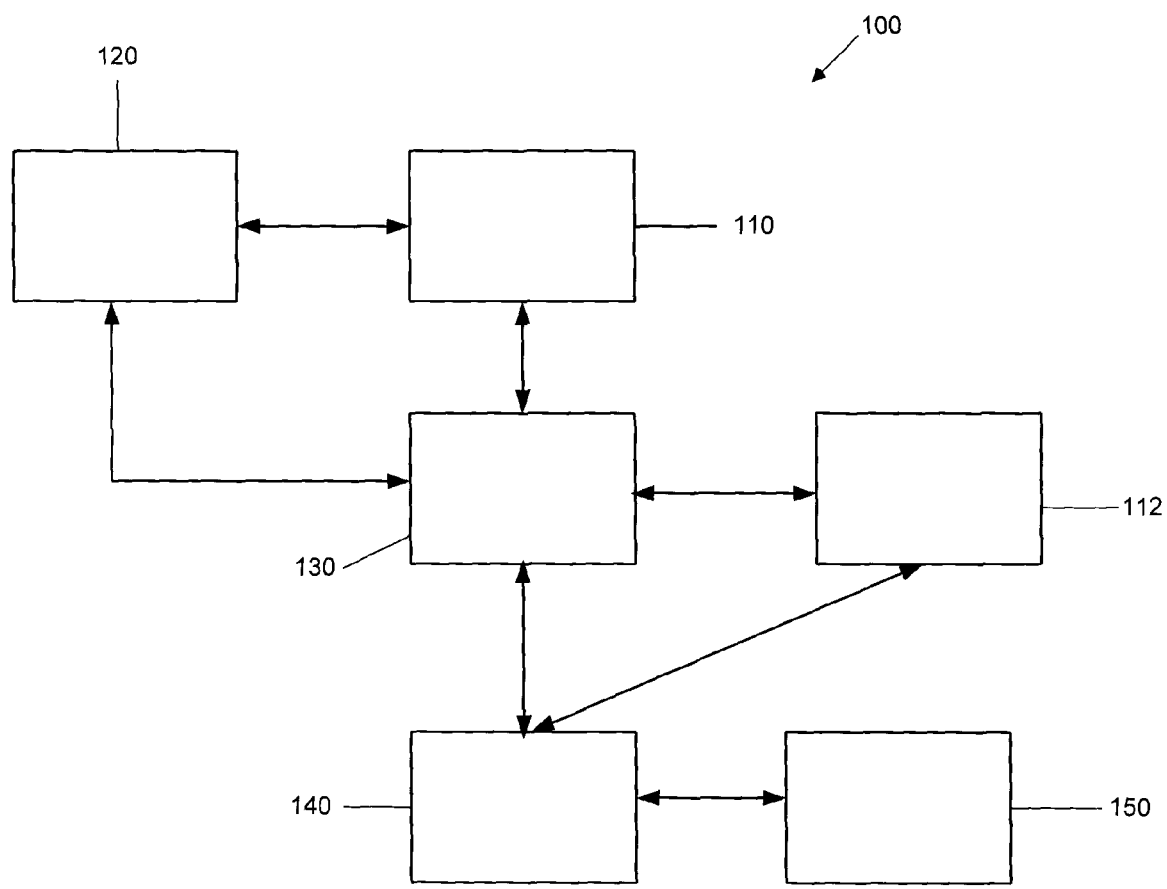
FIG. 1 is a schematic diagram depicting an example network communications system according to one disclosed embodiment.

In the drawings, embodiments of the invention are illustrated by way of example. It is to be expressly understood that the description and drawings are only for the purpose of illustration and as an aid to understanding, and are not intended as a definition of the limits of the invention.

DETAILED DESCRIPTION OF THE INVENTION

The present invention is a proxy based network communication system and method that incorporates one or more proxy servers that are configured as a dynamically reconfigurable network and a client application that is operable to automatically identify aspects of a user's network environment and details of the servers in said network and to set-up and configure software to be utilized by a user without user input of details of the user's network environment. These operations of the present invention may be undertaken at a point of user setup and reinitiated upon recognition of a communication problem. The present invention may further be operable to restrict a user to access only the part of the network. This part of the network is an area which the user is allowed to access. A user is thereby prevented from accessing other parts of the network. The present invention therefore provides a secure environment by implementing changing proxy servers rather than static proxy servers and restricting user access within the network on a need-for-access basis.

The proxy servers in accordance with the present invention are incorporated in the network of the present invention, as disclosed herein.

Embodiments of the present invention may incorporate one or more client applications. Such client applications may be, for example, client software, a client computer program, or any other application. The client applications may be automatically run in the present solution, either from the portable storage device, for example, such as a USB key, or from a network gateway device which may cause one or more client applications to be downloaded from the Internet. One or more of the client applications may be operable to perform automatic detection, for example, such as of proxy server addresses or other detections processes disclosed herein. One or more of the client applications may also be operable to perform configuration as disclosed herein.

The present invention may be operable to allow users to browse or otherwise access network content of the Internet or other network resource in a secure and private manner. Such access may occur via a client computing device, for example, such as a personal computer or mobile communication device. Encryption may be applied to communications between the client computing device and a network of proxy servers. The client application may be operable to bypass or avoid local networking restrictions, or monitoring that may be applied by intermediate networking devices. A proxy server selection means, that may incorporate an algorithm or other calculations, may be applied by a browser program running at the client computing device. The proxy server selection means may be operable to select a proxy server from the network of proxy servers in an automated manner. For example, the proxy server selection may automatically select a proxy server from the network of proxy servers without requiring manual selection by the user. The proxy server selection means may be configured to avoid or reduce proxy server blacklisting as may be applied by intermediate networking devices. Once connected to the network via one or more proxy servers of the present invention, the user's browsing activity is both secure and private.

A skilled reader will recognize that the above functionality may be implemented in a number of ways. In one embodiment of the present invention, for example, a portable storage device and/or network gateway device may be disclosed that connects to a client computing device via a wired connection, for example, such as by a USB, Ethernet, or other wired connection, or via a wireless connection, for example, such as a Bluetooth, Wi-Fi, or other wireless connection. Upon connection to the client computing device, the portable storage device and/or network gateway device may provide software that launches a web browser at the client computing device. The portable storage device and/or network gateway may also create a secure connection with a network of proxy servers. Session information, for example, such as cookies, preferences, cached items, or other session information, that is used or acquired during a browsing session may be stored at the portable storage device and/or network gateway device instead of at the client computing device. One or more client applications may be automatically initiated when the portable storage device and/or network gateway device connects to the client computing device, as disclosed herein.

When the user is finished browsing, the user will remove, close, or otherwise terminate the connection between the client computing device and the portable storage device and/or network gateway device. At this point, in accordance with the present invention, no trace of the browsing session may be detected on the client computing device.

The present invention may further undertake activities including auto-discovery, auto-proxy selection, auto browser configuration or unlocking browser data on storage device before browsing begins.

The portable USB key that may be utilized in the present invention may launch a password protected web browser that secures Internet traffic. The present invention may apply encryption, as disclosed herein. All web history, bookmarks and passwords may be stored on the USB Key to ensure personal information of the user is not left behind on any computing device for other user to see such personal information. A user may create an Internet connection on any computing device through use of the USB Key with such computing device. The present invention will automatically establish an encrypted tunnel through a private network, Thus, the present invention offers a user the convenience of a personal web browser on any computing device. It further ensures that the user will always have his or her bookmarks, passwords and browser preferences with him or her at all times.

As yet another example, a proxy server or other server device may store session information for a user account. A browsing program running at a client computing device may obtain session information associated with a user account from the proxy server or other server device. Alternatively or additionally, session information may be applied by a proxy server without the session information being shared with the browser program. A proxy server may store the session information at a local storage device, or may retrieve the session information from a remote server device that is responsive to authentication of the client computing device for a given user account. The user account may be identified by user authentication. The user account may alternatively be identified by identifying a portable storage device and/or network gateway device associated with the client computing device.

The client application of the present invention may be operable to automatically obtain a set of one or more proxy addresses, and select a proxy address from the set of one or more proxy addresses by a selection means. The selection means may utilize an algorithm or other calculations to select the proxy address. The proxy address may be used to automatically configure the software with that IP address. A request message may be generated for a network resource at a client device. The request message may be sent to a proxy server residing at the selected proxy address via a wide area network. The proxy server may process the request message by forwarding the request message to a network server hosting the network resource and receiving a response message from the network server that includes the network resource. The client device may receive the response message from the proxy server via the wide area network, and process the network resource. For example, the network resource may be processed by presenting the network resource to a user.

In another embodiment of the present invention, a request message may be generated by a client device and sent directly to the network server hosting the network resource, or may be sent to the network server through an intermediate server and/or a WAN.

The portable storage device incorporated in the system of the present invention may include any combination of the following: a set of proxy addresses; selection parameters to be applied by the selection algorithm; session information, for example, such as cookies, browsing history, bookmarks, etc.; a browser program; and/or other software components to enable proxy selection and proxy based network communications. The portable storage device may be operable to lock and unlock access to the browsing data. For example, the portable storage device may be operable to lock and unlock access to any of the following: the list of proxy addresses; the history of websites visited; and bookmarks.

In one embodiment of the present invention, the system may be operable to verify that an Internet connection is secure when the Internet is accessed through a proxy network. The present invention may further be operable to re-verify that the connection is secure after the initial user set-up and connection. In one embodiment of the present invention, a visual confirmation that a connection is secured is provided which confirms to a user that their connection is secured by a proxy network provided by a trusted party.

In another embodiment of the present invention, the system may include a browser application operable to notify other applications of a restart when the browser application needs to work cooperatively with other applications when accessing the Internet through a proxy network.

In yet another embodiment of the present invention, the browser application may be adapted to notify a cooperating application which manages the proxy connection whether the browser is shutting down due to a user command, or if the browser is restarting due to a system command. If the browser is shutting down due to a user command the application can shut down. If the browser is restarting due to a system command, for example, such as a command to install an add-on or any other command, the application can remain open to allow the user to connect after the browser application restarts.

The present invention offers particular advantages and benefits over the prior art. For example, most common prior art proxy services run relatively static server networks. In the prior art, when users sign up to prior art proxy services, technical details are provided to the user, often in an email. The user can then review the technical details and use the technical details to self-configure the software needed to use the service. The present invention incorporates a set of proxy servers and/or a network that are not static, but are dynamic, in that the proxy servers and configuration of such servers into a network of the present invention are constantly changing. The change in the proxy servers of the present invention offers benefits of increased security for users over the static servers in prior art proxy services. The present invention may further allow a service provider or other entity who is running such a network to grow and shrink the size of the network to match the current user load.

Moreover, the dynamic nature of the proxy servers in the network of the present invention may be operable so that users do not have to offer input or take steps to setup their software, as is required by the prior art. The present invention may be operable to automatically discover aspects of the user's network setup, as well as details of the network servers. In this manner the present invention allows for setup without requiring any steps to be completed by the user, which increases the ease of the setup process as experienced by the user.

Prior art proxy services generally provide access to the whole of a network to a user. The present invention incorporates a means, that may include algorithms and calculations, whereby it users may be restricted to discover only a select part of the network of the present invention. In this manner users may be prevented from discovering more of the network than each user requires. The result is that the network access provided to each user is tailored to include the aspects of the network that the user needs to access.

The present invention may undertake steps, such as automatically discover aspects of the user's network setup and details the network servers, as well as setting the part of the network that a user may discover, at the point of setup. These steps may also be undertaken at other points in time, such as whenever a problem occurs in the network. In this manner the present invention remains current in a manner that the prior art fails to achieve.

The prior art proxy services generally do not provide special software or other applications to the user. Users must access the prior art proxy services by utilizing a standard web browser that is installed on the computer that the user is utilizing. The result is that users do not have access to any enhanced functions for example, such as any indication as to Whether their proxy connection is secure and is connected to a trusted service provider. The present invention provides special applications, for example, such as enhanced software, to a user that allows a user to be alert to the security of their connection and whether the connection is to a trusted service provider.

Prior art proxy services further generally do not include a USB key. Or, if the prior art does incorporate a USB key then the user still is required to configure the software themselves. The USB key in such prior art systems is merely a data container. The USB key in prior art systems is not an integrated part of the solution. The present invention may include a USB key wherein data is portioned into a CD section and a data section. The present invention further automatically starts loading and running applications, for example, such as software, stored on the USB key when that USB key is plugged into a computer, the prior art USB keys do not automatically load and run software stored thereon, but require the user to initiate loading and running of applications, for example, such as software, stored on the USB key. The present invention further is operable to automatically update the software that is stored on the USB key without the use of custom application drivers, which the prior art systems are not able to achieve.

Some prior art systems require an add-on, which is sometimes classified as a proxy management tool, for the browser to be operable. An add-on may be utilized in the configuration of the proxy settings of the browser may work in conjunction with the proxy service. User may be emailed their account details and they will be required to use these account details to configure the proxy service manually. The present invention, as described herein, does not require the user to utilize account details to undertake any setup steps. The present invention is operable to undertake any or all of the following steps: a discovery process whereby it identifies aspects of the user's network setup as well as details of the network servers; automatic configuration of user software in the network; and showing an indicator of the security of a user's connection and whether the connection is to a trusted service provider.

For all of these reasons described herein, the present invention offers advantages and benefits over prior art proxy services. A skilled reader will recognize further advantages and benefits offered by the present invention over the prior art as examples of embodiments of the present invention are described herein.

The descriptions of embodiments of the present invention and the embodiments shown in the FIGs are provided as examples of embodiments of the present invention. A skilled reader will recognize that the system and method of the present invention is capable of a variety of embodiments and of being practiced and carried out in various ways.

As shown in FIG. 1, in one embodiment of the present invention a network communications system 100 may incorporate one or more of a client device 110, a communication device 120 that may be either a portable storage device and/or a network gateway device, an intermediate device 130, a proxy server 140, a resource server 150, and a configuration and coordinating server 112.

The client device 110 nay be or incorporate a computing device, for example, such as a personal computer, tablet, laptop, mobile device, video gaming console, cable television box, or other computing device. The network communications system may incorporate one or more client device. Each client device included in the network communications system may incorporate a processor and a storage device. Instructions may be stored in the storage device, and said instructions may be executable by the processor of the client device to perform one or more of the methods of the present invention that are disclosed herein. As an example, in one embodiment of the present invention, the client device may be configured to perform one or more methods of the present invention via one or more software programs that may be run at and/or by the client device.

The communication device 120 may be connected or otherwise linked, either through a wired or wireless connection, to the client device. The connection between the communication device and the client device may be configured so that data or other information may be transferred to and from the client device and the communication device. Through bi-directional communication between the communication device and the client device, a user may be verified.

Such verification of a user may involve the application of a two-factor authentication scheme. As a first aspect of the two-factor authentication scheme, the client device may be operable to discover aspects of the communication device and to thereby ascertain whether the communication device is of a known hardware type. The client device may also prompt the user for their password. The user may be validated if both of the following results occur: (i) the communication device is identified by the client device to be of a known hardware type; and (ii) the password provided by the user is identified as correct for said user. Once validated, the communication device may unlock the browser data, launch the browser and connect to the secure proxy network.

The client device 110 may obtain information and/or instructions executable by a processor of the client device from the communication device 120. For example, if the communication device includes, or is configured, as a portable storage device the information and/or instructions may be accessed from the storage in the portable storage device. In embodiments of the present invention, the communication device may include or be configured as a portable storage device, for example, such as a mass storage device that may be a USB mass storage device, or as a mobile computing device that also incorporates a processor for executing instructions. If the communication device is configured as a portable storage device it include security aspects operable to ensure that the data transferred within the network is protected as private, or alternatively may allow constant access to all the data by the client device so that all of the data is always available to the client device.

The communication device 120 may alternatively or additionally incorporate, or be configured as, a network gateway device, for example, such as a network router or another network gateway device that is a computing device such as a personal computer, mobile device, video gaming console, cable television box, or other computing device.

The client device 110 may communicate directly, in a bi-directional manner, with the intermediate device 130. The client device may communicate with the proxy server 140, either: (i) via the communication device 120 and the intermediate device, if the communication device includes or is configures as a network gateway device, there being a bi-directional communication link between the intermediate device and the communication device, and another bi-directional communication link between the intermediate device and the proxy server; or (ii) via the intermediate device 130, there being a bi-directional communication link between the intermediate device and the proxy server. The client device may further communication with the resource server 150 either: (i) via the communication device 120 and the intermediate device, if the communication device includes or is configures as a network gateway device, there being a bi-directional communication link between the intermediate device and the communication device, and another bi-directional communication link between the intermediate device and the proxy server, and a bi-directional communication link between the proxy server and the resource server; or (ii) via the intermediate device 130, there being a bi-directional communication link between the intermediate device and the proxy server, and a bi-directional communication link between the proxy server and the resource server.

The client device 110, or the communication device 120 if it is configured to be or incorporate a network gateway device, may obtain a set of one or more proxy addresses, and select a proxy address from the set of one or more proxy addresses according to a selection means, The selection means may include an algorithm or other calculations. The selection means may be based on a number of variables or parameters including any of the following: geographic location of client device, and previous success or failure with connecting to specify proxy server addresses. The communication device may include any of the following: a set of proxy addresses; selection parameters to be applied by the selection algorithm; session information, for example, such as cookies, browsing history, bookmarks, or any other session information; a browser program; and/or other software components to enable proxy selection and proxy based network communications.

The client device 110 may generate a request message for a network resource at the client device. The request will automatically include authentication information based on any login information provided by the user. As an example, the client device may send the request message to the proxy server that resides at the selected proxy address via a wide area network.

In a network of the present invention, a plurality of proxy servers may be accessible by or incorporated in, the network. Thus, proxy server 140 may represent one of a plurality of proxy servers of network communications system 100.

Intermediate device 130 may be operable to monitor communications between the client device 110 and the proxy server 140, for example, such as via a firewall or other monitoring system. Communications between the client device 110 and the proxy server 140 may be encrypted so that such communications cannot be decrypted by intermediate device 130.

The proxy server 140 may be operable to receive and process request messages. For example, the proxy server may forward a request message to a network server hosting the network resource, and may receive a response message from the network server that includes the network resource. The proxy server may also be operable to store network resources to be sent to one or more other client devices in response to requests received from those client device.

The proxy server 140 may send a response message to client device that includes the network resource. The client device 110 may receive the response message from the proxy server 140 via the wide area network, and may process the network resource in any suitable manner. For example, a browser program running at client device 110 may process the network resource by rendering the network resource at graphical user interface (GUI) of the client device. A skilled reader will recognize that other suitable manners of processing a network resource may be possible in embodiments of the present invention.

The configuration and coordinating server 112 may be connected via a bi-directional connection to the intermediate server and via a bi-directional connection to the proxy server. The configuration and coordination server may be operable to discover proxy server addresses for use by the client device to create a secure connection for use by the user. For example, the configuration and coordinating server may discover proxy server addresses and such proxy server addresses may be incorporated into a list of proxy server addresses discovered by other elements of the network, such as the client device, or multiple client devices. Moreover, in an embodiment of the network that incorporates multiple proxy servers, the configuration and coordinating server may be operable to coordinate the functions of the multiple proxy servers or imposed standards or policies upon the multiple proxy servers, as described herein. The configuration and coordinating server may further be operable to configure multiple proxy servers.

Figure 2:
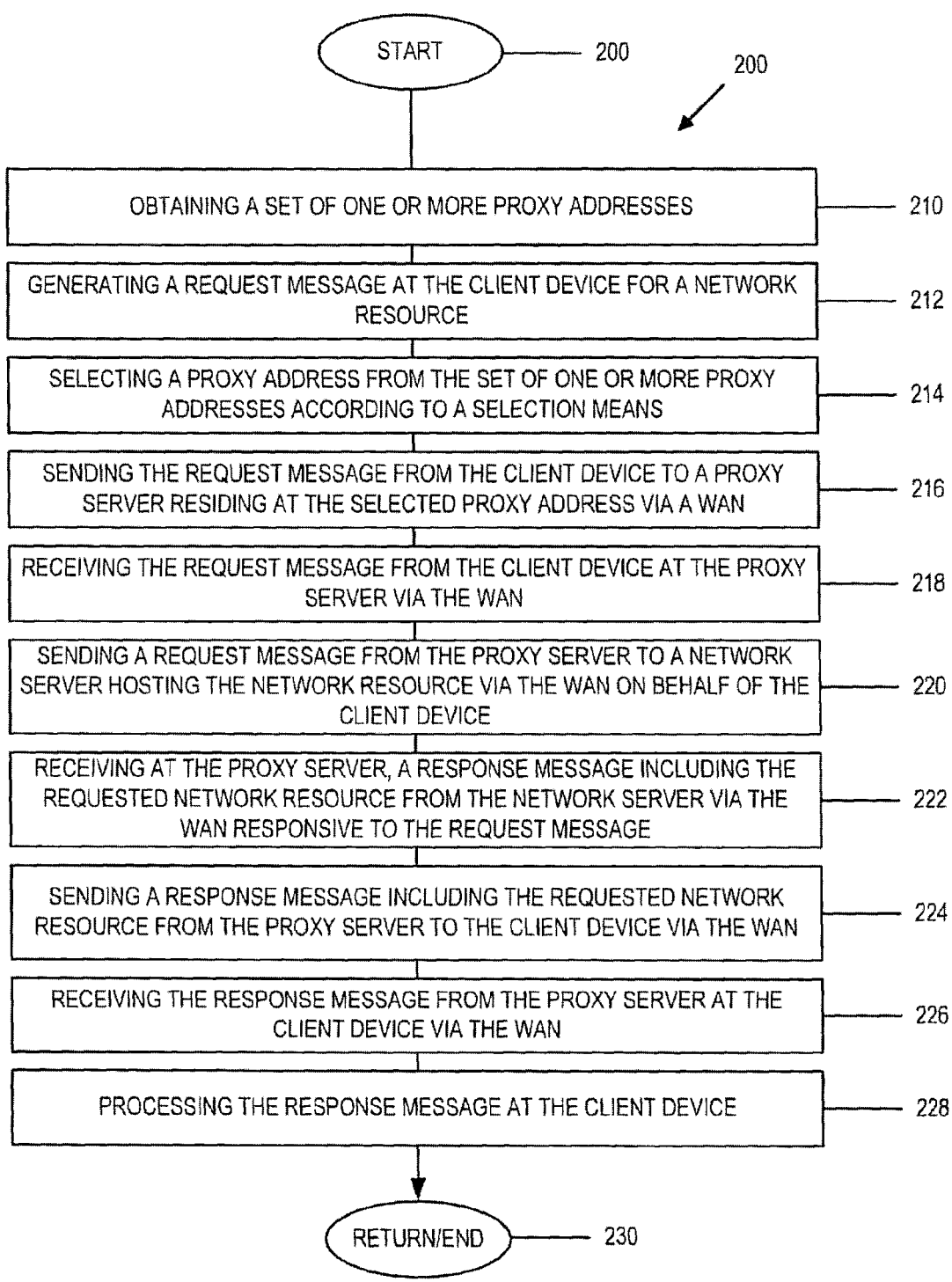
FIG. 2 is a flow diagram depicting an example network communications method according to one disclosed embodiment.

A method of an embodiment of a network communications method 200 of the present invention is shown in FIG. 2. The network communications method 200 starts 208, and as a first step, a set of one or more proxy addresses is obtained. Each proxy address of the set of one or more proxy addresses may correspond to a respective proxy server. In at least some embodiments of the present invention, a client device may obtain a set of one or more proxy addresses from one or more of: (1) a portable storage device in communication with the client device; (2) a remote server device in communication with the client device via a wide area network; and/or (3) locally from a storage device of the client device. In other embodiments of the present invention, a network gateway device located between the client device and the proxy server may obtain a set of one or more proxy addresses from: (1) a remote server device in communication with the network gateway device via a wide area network; and/or (2) locally from a storage device of the network gateway device.

Automatic proxy selection may occur as integrated with the request process step 212, alternatively automatic proxy selection may occur prior to the request step. If proxy selection occurs prior to the request step then proxy selection can involve three distinct steps: discovery of the proxy server addresses; selection of the best proxy server to use for a connection; and an attempt to create a connection to the proxy server that is designated the best proxy server to use. Should the attempt to create a secure connection to the proxy server fail, then the three steps may be reinitiated. Re-initiation of the steps may occur until a secure connection to a proxy server is achieved. Once the secure connection is achieved it can be utilized and shared for all requests.

In some embodiments of the present invention, obtaining the set of one or more proxy addresses may include retrieving the set of one or more proxy addresses from an encrypted file stored at a storage device of the client device or connected to the client device, for example, such as a removable mass storage device, and decrypting the file to access the set of one or more proxy addresses. Alternatively, or additionally, obtaining the set of one or more proxy addresses may include receiving the set of one or more proxy addresses in an encrypted message sent by a network server via a wide area network, and decrypting the encrypted message to access the set of one or more proxy addresses. The network server may include a proxy server or a coordinating server used for discovery of proxy addresses. In some embodiments of the present invention, both methods may be utilized and the resultant list of proxy addresses may be combined.

As a next step, a request message may be generated at the client device for a network resource 212. A skilled reader will recognize that the request message for a network resource may be generated at the client device in a variety of manners. For example, the client device may generate the request message at a browser program running at the client device in response to user browsing activity. Request messages may be generated at the client device, for example, such as by an application program. The client device may not require receipt of any input provided by a user. The generated request message may be, or include, an encrypted request message. A skilled reader will recognize that any suitable encryption algorithm may be applied to encrypt the request message for example, such as SSL or TLS.

As a next step, a target proxy address may be selected from the set of one or more proxy addresses 214. The proxy address may be selected according to a selection means that may include an algorithm and other calculations. A skilled reader will recognize that a variety of selection means may be applied. For example, the selection means may define an order or hierarchy for the selection of a proxy address from the one or more proxy addresses included in the set of proxy addresses. In embodiments of the present invention, the proxy address may be selected at the client device, for example, such as from the set of one or more proxy addresses obtained at step 210. In other embodiments of the present invention, the proxy address may be selected at a network gateway device located between the client device and the proxy server, for example, such as from the set of one or more proxy addresses obtained at step 210.

The selection means whereby the proxy address is selected from the set of one or more proxy addresses may involve balancing requests among the one or more proxy addresses over one or more browsing sessions. In embodiments of the present invention, selecting the proxy address from the set of one or more proxy addresses may involve randomly selecting the proxy address from the net of one or more proxy addresses. In other embodiments of the present invention, selecting the proxy address from the set of one or more proxy addresses in accordance with the selection means may involve sending a test message to each of a plurality of proxy servers residing at a plurality of proxy addresses of the set, receiving a response message from each of at least some of the proxy servers in response to the test messages, and selecting the proxy address based, at least in part, on a round-trip time of the test message and response message. In such an embodiment the proxy address related to the test message and response message combination having the lowest round-trip time may be chosen as the proxy address.

In yet another embodiment of the present invention, selecting the proxy address from the set of one or more proxy addresses in accordance with the selection means may involve sending a test message to each of a plurality of proxy servers residing at a plurality of proxy addresses of the set, receiving a response message from each of at least some of the proxy servers in response to the test messages, the response messages including measurement information reported by the proxy servers (for example, such as server load, latency, congestion, and other measure information reported by the servers), and selecting the proxy address based, at least in part, on the measurement information reported by the proxy servers.

A skilled reader will recognize that other variables and parameters may be applied to test the combination of a test message and response message set to choose a proxy address from a set of proxy addresses. For example, such other variables and parameters may include geographic location, pass success in connecting to that proxy address, or any other relevant variable or parameter, or combination of variables and/or parameters.

Once a connection is made to a proxy server, the system requires that one or more verification steps be undertaken to verify that the server is a trusted resource. Verification may be undertaken by using some combination of factors, for example, such as the SSL/TLS protocol, the exchange of certificates, and making a request to a verification service. The verification factors will be utilized to determine whether the proxy server is part of the trusted network.

As a next step, the request message (generated at 212) from the client device may be sent to a proxy server residing at the selected proxy address via the wide area network 216. The request message may include an HTTP request message or any other suitable request message for the network resource to be returned responsive to the request. In embodiments of the present invention, generating the request message includes encrypting the request message prior to sending the request message to the proxy server.

As a next step, a request message may be received from the client device at the proxy server via the wide area network 218. The request message received at the proxy server may indicate the network location of a server device hosting the network resource requested by the client device, for example, such as the network address. If the request message was encrypted, the proxy server may decrypt the request message. In embodiments of the present invention, the user may be authenticated by the proxy server before processing the request message.

A skilled reader will recognize that authentication may be achieved by a variety of method. As an example of one such verification method, the proxy server may authenticate the user to check that a subscription for use of the proxy server has been paid by the user, or that user information is up-to-date. The proxy server may receive username, password, or other suitable authentication information from the client device, and may perform user authentication locally or may forward such information to a coordinating server for authentication. In response to successful authentication of the user by the proxy server or a coordinating server, the proxy server may process the request message received from the client device. If the subscription information has not been paid by the user, then the client device may be prompted or redirected to a network resource enabling the user to renew the subscription. As an example, a subscription may be paid by the user by submitting credit card, bank account, or other suitable payment information.

As a next step, a request message may be sent from the proxy server to the network server hosting the network resource via the wide area network on behalf of the client device 220. Alternatively or additionally, the proxy server may retrieve the network resource from local storage.

As a next step, a response message may be received at the proxy server via the wide area network (that is responsive to the request message sent by the proxy server at 220) that includes the requested network resource from the network server 222.

As a next step, a response message may be sent from the proxy server to the client device via the wide area network 224, and such message may include the requested network resource. The response message sent by the proxy server to the client device may include an encrypted response message that utilizes any suitable encryption protocol.

As a next step, the response message may be received at the client device from the proxy server via the wide area network 226.

As a next step, the response message may be processed at the client device 228. The processing of the message may involve, for example, a browser program or other suitable program running at the client device. In one embodiment of the present invention, the browser program may render the network resource at a graphical user interface (GUI). In another embodiment of the present invention, processing the response message may involve decrypting the response message, for example, such as if the response message was encrypted by the proxy server.

As a next step, the network communications method 200 may either end or otherwise terminate at this point, or may repeat any or all of the steps of the method. For example, the method may return to step 210 and repeat steps 210-228 in order one or more times.

In embodiments of the present invention, a step 214 may involve selecting a different proxy address from the at of one or more proxy addresses in response to one or more of: (1) expiration of a timer; (2) attaining or exceeding a predefined number of request messages or response messages exchanged between the client device and the proxy server residing at the selected proxy address; (3) attaining or exceeding a predefined amount of data exchanged between the client device and the proxy server residing at the selected proxy address; (4) proxy server being blocked and no longer accessible; (5) client device changes networks and there is a more suitable proxy server for the new network; and (6) based on the location of the desired network resource that the client device wishes to retrieve. It may be possible for switching between different proxy servers to be performed during lulls in browsing activity, or when network resources are requested from a resource server of a new or different domain.

Figure 3:
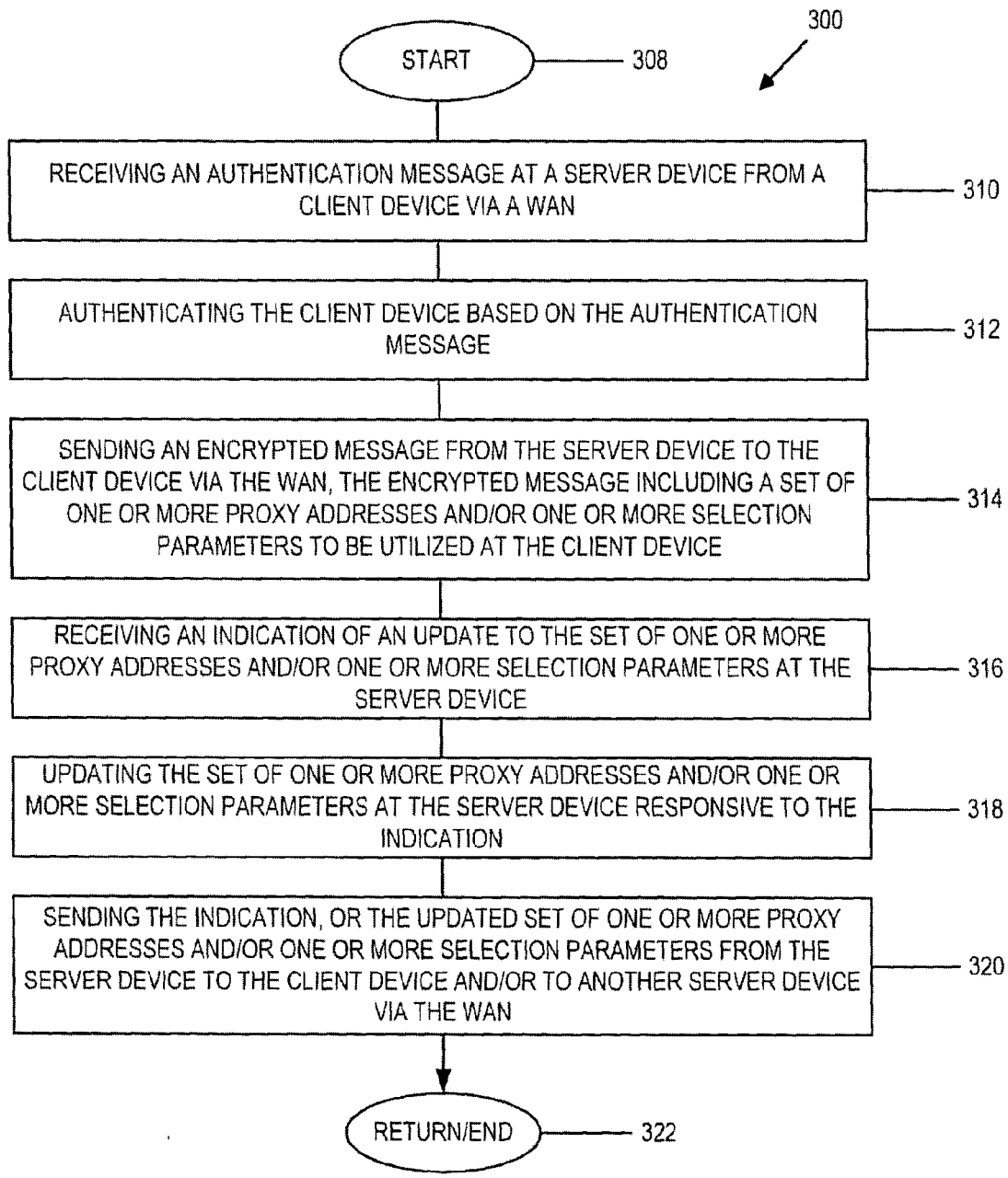
FIG. 3 is a flow diagram depicting an example network communications method according to one disclosed embodiment.

Another embodiment of the present invention may incorporate the authentication method 300 that is another example networks communication method that involves an authentication message, as shown in FIG. 3. This method may start 308, and then include a step for receiving an authentication message from a client device at a server device via a wide area network 310. Alternatively, if a network gateway device is utilized, the authentication message may be received from the network gateway device.

As a next step, the client device may be authenticated based on the authentication message 312. Alternatively, the network gateway device may be authenticated based on the authentication message if a network gateway device is utilized by the network. As disclosed herein, authentication may be performed locally at a proxy server or at a coordinating server, and may include a step whereby it may be determined whether: a subscription has been paid by the user; and/or user information is up-to-date.

As a next step, in response to successful authentication of the client device (based on the authentication message of step 312) an encrypted message may be sent to the client device via the wide area network 314. Alternatively, in response to successful authentication of the network gateway device an encrypted message may be sent to the network gateway device, if a network gateway device is utilized in the network. The encrypted message may include: a set of one or more proxy addresses that correspond to one or more proxy servers; and/or a set of one or more selection parameters to be utilized by either the client device or the network gateway device, depending on whether a network gateway device is utilized. The one or more proxy addresses are selectable by the client device (or the network gateway device if a network gateway device is utilized) from the set of proxy addresses to obtain access to network resources via the one or more proxy servers. The selection may be in accordance with a selection means, that may incorporate an algorithm or other calculations. The selection means may be incorporated in the client device (or in the network gateway device if a network gateway device is utilized). In embodiments of the present invention, one or more proxy addresses may be updated at a client device in response to one or more other proxy addresses being blacklisted or otherwise non-functioning with respect to that client device or other client devices.

The proxy addresses returned may be selected specifically for each client device. The selection means used to select the addresses may use a number of inputs, including one or more variables or parameters, for example, such as a geographic location, performance measurements, or other variables or parameters that focus on limiting how much of the proxy network a client can discover.

As a next step, an indication of an update to the set of one or more proxy addresses and/or one or more selection parameters may be received at the server device 316. A skilled reader will recognize that the indication may be of various types. For example, a proxy server may detect that communications with a client device have been blocked by an intermediate firewall. The set of proxy addresses may be updated to remove a proxy address of the proxy server from the set of proxy address so that the client device or other client devices do not select that proxy address.

As a next step, the set of one or more proxy addresses and/or one or more selection parameters may be updated at the server device in response to the indication 318. The server device may include a proxy server or a coordinating server.

As a next step, the indication, or the updated set of one or more proxy addresses and/or one or more selection parameters, may be sent from the server device to the client device and/or to another server device via the wide area network 320. As an alternative the indication, or the updated set of one or more proxy addresses and/or one or more selection parameters, may be sent from the server device to the network gateway device and/or to another server device via the wide area network.

As a next step, the method may end or otherwise terminate, or step 310 may be reinitiated and any or all of steps 310-320 may be repeated one or more times.

Alternatively or additionally, authentication method 300 may involve updating the set of one or more proxy addresses at the client device based, at least in part, on a response to a request message sent to a proxy server message by a firewall located between the client device and the proxy server residing at the proxy address. For example, a firewall may block the request message from being delivered to the proxy server. In embodiments of the present invention, updating the set of proxy addresses may involve eliminating the proxy address from subsequent selection from the set, The client device (or network gateway device if a network gateway device is utilized) may send an update message to a network server (for example, such as a proxy server or a coordinating server) via the wide area network. The update message may include the updated set of one or more proxy addresses. The client device (or the network gateway device if a network gateway device is utilized) may also update the set of one or more proxy addresses based, at least in part, on update information received from a network server (for example, such as a proxy server or coordinating server) via the wide area network.

Figure 4:
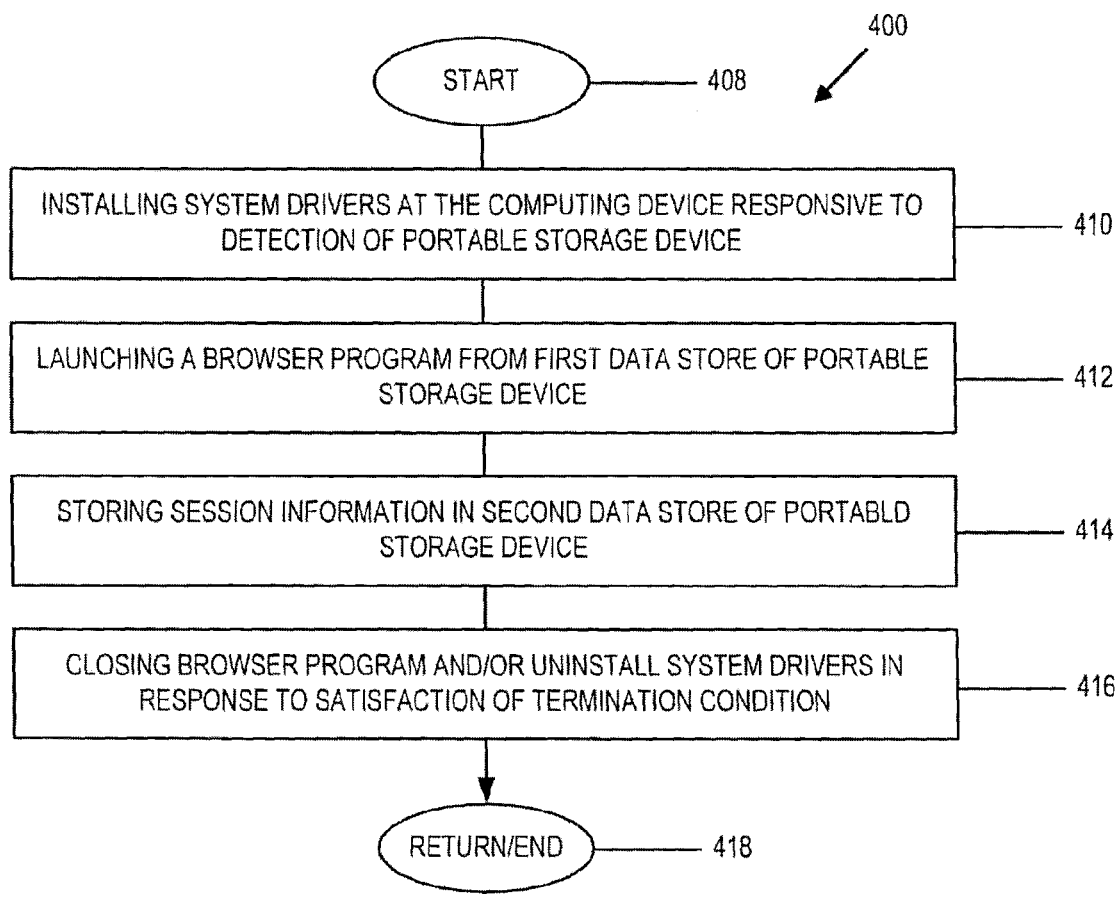
FIG. 4 is a flow diagram depicting another example network communications method according to one disclosed embodiment.

Another embodiment of the present invention, may incorporate browser method 400 that is another example of a network communication method, as shown in FIG. 4. After starting 408, browser method 400 may include an optional step that involves installing system drivers from a portable storage device at the computing device responsive to detection of the portable storage device 410. This step is not required to be incorporated in browser method 400. As an example of step 410, the portable storage device may include a USB mass storage device that can be physically coupled to the computing device via a USB port. The USB mass storage device may be detected by the computing device responsive to the USB mass storage device being physically coupled to the computing device.

As another example of step 410, the portable storage device may include a wireless device supporting near-field wireless communications with the computing device, for example, such as Wi-Fi, Bluetooth, or any other near-field wireless communication. The wireless device may be detected by the computing device that is responsive to the wireless device which is entering a predetermined threshold proximity of the computing device. Upon detection of the portable storage device, the system drivers may be received and installed by the computing device to support further transfer of information between the computing device and portable storage device. In embodiments of the present invention, the system drivers may be held in a first data store of the portable storage device.

Client software may authenticate the user by utilizing the password the user inputs and the presence of the USB device. The software may require the use of both the input and the presence of the USB device to undertake authentication of a user, and the software may not be used with just one of the input or the USB device presence.

In embodiments of the present invention, instructions held on the portable storage device may be configured to close pop-up windows or system alerts on behalf of the user. Such pop-up windows or system alerts may be generated by the operating system or some other program of the computing device. For example, pop-up windows or system alerts may be generated in response to factors detected by the portable storage device.

In another embodiment of the present invention, a method for specific proxy servers to direct client requests in accordance with particular rules may be provided. The method may involve specific proxy servers determining the rule in accordance with which a particular client request is to be directed. In such an embodiment of the present invention, the rules may be of various types, as will be recognized by a skilled reader. For example, the rules may be related to online browsing, destination restrictions, geographic location of the client device, or other aspects of the network environment or user requirements.

As a next step, a program may be launched from the first data store of the portable storage device 412. The program may be configured to implement portions of authentication method 300, as shown in FIG. 3. For example, the program may be configured to direct network communications from the client device through a proxy server.

As shown in FIG. 4, browser method 400 may further include generating a prompt at the computing device via the browser program for a user to provide authentication information. In embodiments of the present invention, the browser program launched at step 412 may be configured to prompt the user to provide the authentication information such as a password, username, key, or other authentication information. In response to successful authentication of the user based on the authentication information input by the user at the computing device, state information may be retrieved from a second data store of the storage media to populate a user session of the browser program. The state information may include a set of proxy addresses and/or selection criteria for proxy servers through which network communications may be directed by the browser program as previously described. State information for example, such as cookies, browsing history, bookmarks, preferences, or other state information, for use during a browsing session may be stored in the second data store of the portable storage device.

As a next step, browser method 400 may option involve closing the browser program and uninstalling the system drivers, if system drivers were installed, in response to the satisfaction of a termination condition 416. Step 416 is an optional step and is not required to be incorporated in browser method 400. The termination condition may include, for example, a lack of user input at the computing device for a threshold period of time, physical removal of the portable storage device from the computing device or from a wireless proximity range of the computing device, or a user input indicating an intended closure of the browser or end to the user's browsing session. The lack of user input may occur more specifically at the browser program of the computing device. If state information Obtained during the browsing session is stored at the portable storage device, the state information may not remain at the computing device after satisfaction of the termination condition.

As a next step, the method may end or otherwise terminate, or step 410 may be reinitiated and any of or all of steps 410-416 may be repeated one or more times.

Figure 5:
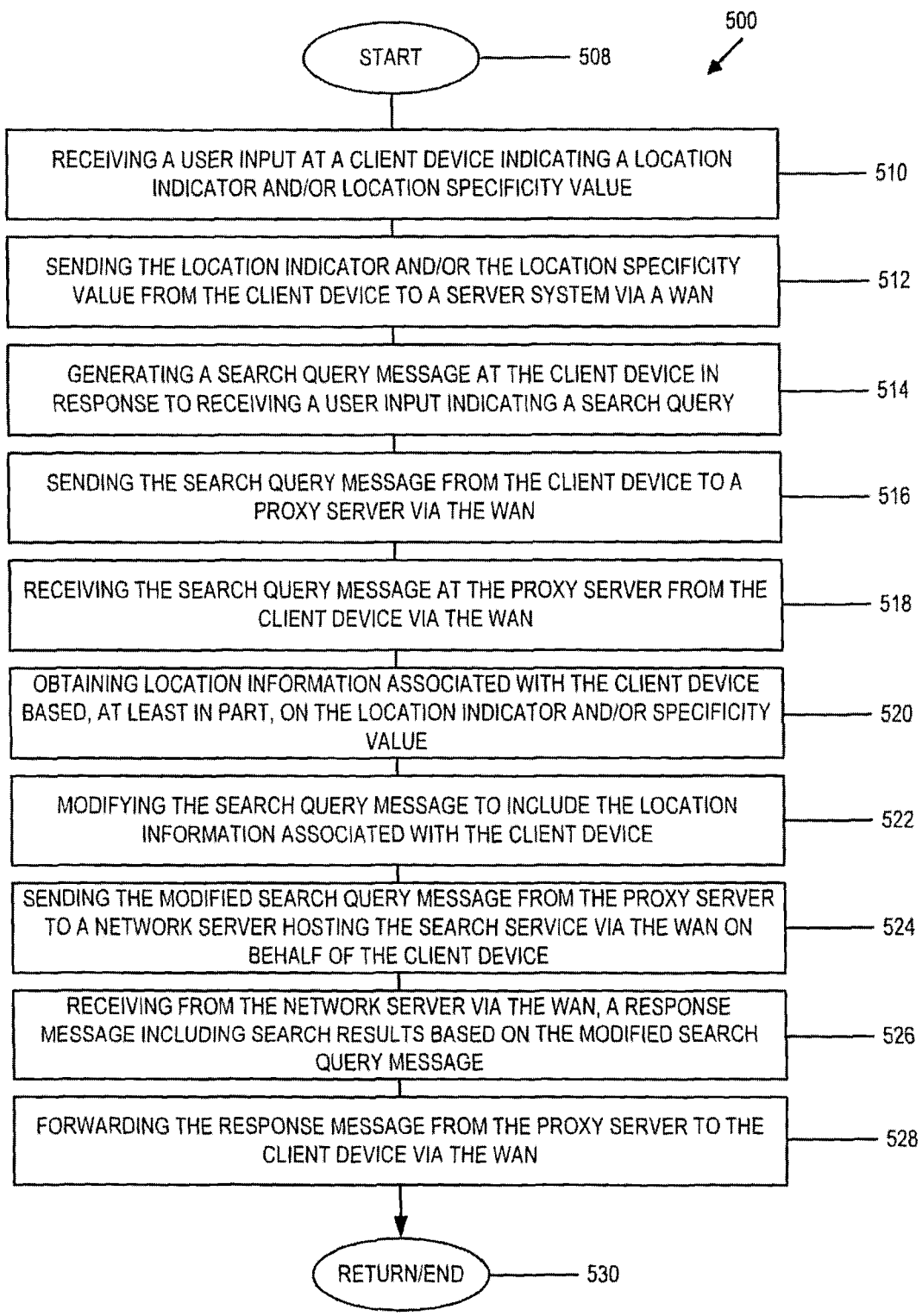
FIG. 5 is a flow diagram depicting another example network communications method according to one disclosed embodiment.

Another embodiment of the present invention may incorporate the location method 500 that is another example networks communication method, as shown in FIG. 5. Location method 500 may enable a user to achieve private personalization as to how location identifying information is shared with others.

The location method 500 may have a start 508. As a next step a user input may be received at a client device. The user input may indicate a location identifier and/or a location specificity value 510. For example, a user location identifier may indicate an actual geographic location or a fictitious geographic location of the client device to be reported to a proxy server. A location specificity value may indicate a level of specificity to be applied to the geographic location indicated by the location identifier.

For example, a user may select a location specificity value from a set of one or more location specificity values that may be applied to the geographic location of the client device. In embodiments of the present invention, the set of one or more location specificity values may provide a range of geographic specificity from broad to narrow. For example, one location specificity value may indicate a state level, another location specificity value may indicate a city level, and yet another location specificity value may indicate a street address level. As another example, one location specificity value may provide latitude and longitude values for a geographic location that is a first geographic distance from the user and another location specificity value may provide latitude and longitude values for a geographic location that is a second geographic distance from the user. By selecting or otherwise defining a particular location specificity value, the user may control the level of detail of the user's geographic location to be shared with third parties, such as network servers that host services that rely on geographic location information.

As a next step, the location identifier and/or the location specificity value may be sent from the client device to a server system via a wide area network 512. Some embodiments of the present invention may incorporate a server system that includes a proxy server, whereas other embodiments of the present invention may incorporate a server device that includes a coordinating server that disseminates policy information to one or more proxy servers.

A skilled reader will recognize that steps 510 and 512 may either not be performed or not be supported in some embodiments of the present invention. For example, a user may not be prompted or may not provide one or more of the location identifier and/or the location specificity value in some embodiments of the present invention.

In embodiments of the present invention, a user may be prompted to opt-in or opt-out of location information modification by the proxy server, in accordance with steps 520 and 522. A user that selects to opt-out may thereby direct the proxy server to refrain from adding location indicating information to information forwarded to other network servers by the proxy server. However, the proxy server may still remove location indicating information from the information received from the client device.

As a next step, a search query message may be generated at the client device in response to a user input indicating a search query 514. For example, a user may enter a search query into a search field of a website, webpage, or browser program interface to initiate a search. The browser program may generate a search query message in response to the search query initiated by the user.

As a next step, the search query message may be sent from the client device to a proxy server via the wide area network 516. In accordance with the disclosure herein, the proxy server may be selected from a set of one or more proxy addresses, and the search query message may be encrypted. The location identifier and/or location specificity value sent to the proxy server, or to a coordinating server that implements policy at the proxy server, directs the proxy server to modify the search query message to include location information. The location information may be associated with the client device of a specificity dictated by the location specificity value. The modified search query message may then be forwarded to a search service. Alternatively, or additionally, the proxy server may obtain an indication of a geographic location of the client device from a different source. For example, the proxy server may perform an IP address lookup for the client device, or may look-up a geographic location of the client device from a user profile that is stored locally at the proxy server, or that is stored remotely at a coordinating server.

As a next step a search query message may be received at the proxy server from the client device via the wide area network 518. The search query message is directed to a search service indicated by the search query message. In embodiments of the present invention, the proxy server may remove location identifying information for the client device and/or user from the search query message before forwarding the search query message to the search service. Due to the fact that the location of the user is provided to the extent permitted by the location specificity value, the search service can provide location relevant information for the client device, rather than merely information relevant to the location of the proxy server.

As a next step, location information associated with the client device may be obtained, based, at least in part, on the location specificity value 520. For example, the proxy server may utilize the location identifier received from the client device to determine the location of the client device. As another example, the proxy server may perform an IP lookup for the client device to determine an approximate location of the client device. Additionally or alternatively, the proxy server may reference a database containing a physical address provided by the client device, or may reference a current GPS location of the client device. Further additionally, or alternatively, the proxy server may identify location information from the search query message.

The location information obtained at step 520 may be based on the location specificity value. The proxy server or a coordinating server may amend, redact, remove, or add location identifying information to the location information obtained for the client device to confirm with the location specificity value. For example, if the current GPS location of the client device is known to the proxy server or a coordinating server, but the location specificity value indicates that only a state level or city level of specificity is to be provided, then the GPS location may be generalized to indicate only that the client device is within a particular state or city. As another example, a latitude and longitude location of a client device may be changed to a different latitude or longitude as indicated by the location specificity value. As yet another example, the location specificity value may indicate a geographic area, for example, such as a geographic area indicated by a distance (e.g., 5 km, 10 km, 20 km, etc.), to which the location of the client device and/or user is to be generalized by the proxy server.

As a next step, the search query message may be modified at the proxy server to include the location information associated with the client device 522. For example, the proxy server may remove location information provided in the search request message received from the client device. The proxy server may further add different location information that complies with the location specificity value. In embodiments of the present invention, retrieving the location information includes performing a location lookup based on an IP address or client identifier of the client device. In embodiments of the present invention, retrieving the location information includes: (i) referencing a location specificity value set by a user of the client device; and (ii) varying the location information included with the modified search query message in response to the location specificity value.

In embodiments of the present invention, modification of the location information occurring at step 522 may not be performed beyond redaction of user information by the proxy server. For example, modification of the location information may not be performed if the user has selected to opt-out.

As a next step, the modified search query message may be sent from the proxy server to the network server hosting the search service via the wide area network on behalf of the client device 524.

As a next step, via the wide area network the proxy server may receive from the network server a response message that includes search results based on the modified search query message 526.

As a next step, the response message may be forwarded from the proxy server to the client device via the wide area network 528. As a result of step 528, a user may obtain search results that are relevant to the location of the user rather than the location of the proxy server. Simultaneously, the user may be enabled to control the specificity of the location information that is shared with the search service.

Although location method 500 has been described in terms of processing a search query through the modification of location identifying information associated with the search query, it will be appreciated that location method 500 may be applied for other purposes and to achieve other results. For example, media content, such as images, videos, or other media content, may be geotagged so that geographic information is associated with the media content. The geographic information may be associated with the media content in some embodiments of the present invention as metadata. The geographic information associated with the media content may be modified by the proxy server before the media content is forwarded to another network server.

A skilled reader will re cognize that although location method 500 has been disclosed to relate to location searches specifically, the present invention may be operable to utilize location information for other purposes, for example, such as website customization, personalization, content customization, or other purposes in accordance with the functions of the client device, browser, any websites accessed, or any other elements incorporated in or accessible by the present invention.

Figure 6:
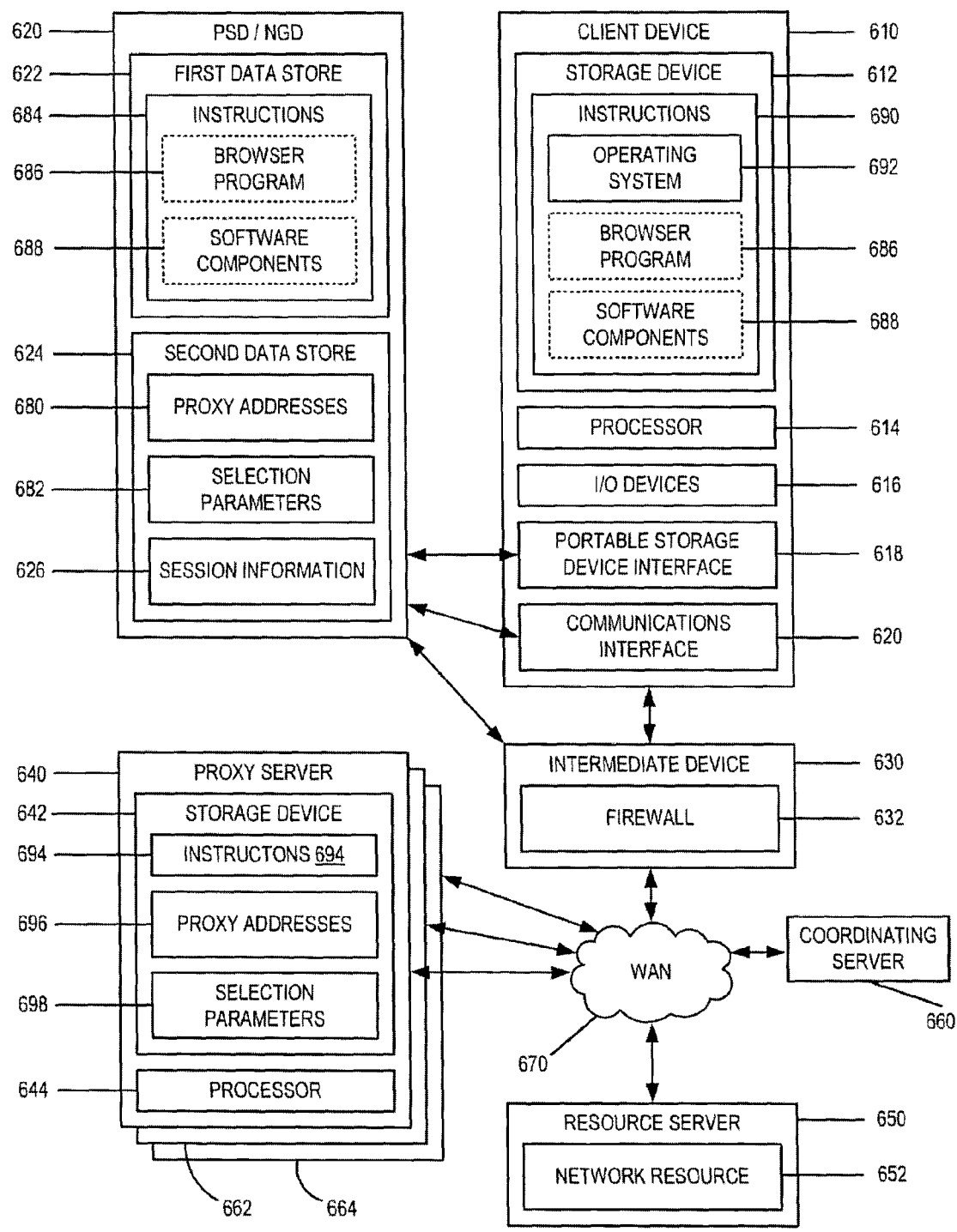
FIG. 6 is a schematic diagram depicting a non-limiting example of the network communications system of FIG. 1 according to one disclosed embodiment.

One embodiment of the present invention may incorporate a WAN compatible network communications system 600, as shown in FIG. 6. Said WAN compatible network communications system includes a network client device 610, a network communication device 620, for example, such as a physical storage device, and/or a network gateway device, a network intermediate device 630, one or more network proxy servers 640, 662, 664, a network resource server 650, a network coordinating server 660, and a wide area network 670.

Network client device 610 incorporate a storage device 612, a processor 614, one or more input and/or output devices 616, a portable storage device interface 618, and a communications interface 619. Storage device 612 may incorporate instructions 690. Said instructions may incorporate one or more of the following: an operating system 692; a browser program 686; and/or one or more software components 688. In one embodiment of the present invention browser program 686 and/or software components 688 may be obtained from the network communication device 620. Furthermore, in embodiments of the present invention, any of proxy addresses 680, selection parameters 682, and/or session information 626, may be obtained by the network client device 610 from the network communication device 620.

Instructions 690 may be executable by processor 614 operable to process and perform one or more of the methods disclosed herein, as shown in FIGS. 3-5, or to process and perform other instructions. In one embodiment of the present invention, portable storage device interface 618 may include a USB port. Communications interface 620 may support wired and/or wireless communications with network communication device 620, for example, such as PSD/NGD, and/or WAN 670. The wired or wireless communications may be achieved via the network intermediate device 630.

Network communication device 620 may include one, two, three or more data stores. Some of the data stores of the network communication device may be password protected. For example, network communication device 620 may include a first data store 622 and a second data store 624. In embodiments of the present invention, data stores may be partitions of a common storage device. For example, data stores 622 and 624 may comprise partitions of a common storage device.

First data store 622 may include instructions 684, such as browser program 686 and/or software components 688. Software components 688 may include system drivers, plug-ins, and/or other suitable software components that may be loaded onto client device 610.

Second data store 624 may include a set of one or more proxy addresses 680, a set of one or more selection parameters 682, and/or session information 626. Session information 626 may include session cookies, browsing history, bookmarks, preferences, or other session information.

Where the network communication device 620 is configured as a network gateway device, network client device 610 may communicate with the network intermediate device 630 via the network communication device 620. The network communication device 620 configured as a network gateway device may be configured to enable a plurality of client devices to communicate with the WAN 670. Where network communication device 620 is configured as a portable storage device, for example, such as a USB flash drive, the network client device 610 may communicate with network intermediate device 630 without directing communications through the network communication device 620.

Network proxy server 640 may include a storage device 642 and a processor 644. Storage device 642 may include any of the following which may be disseminated to client devices: instructions 694; a set of one or more proxy addresses 696; and/or a set of one or more selection parameters 698. Proxy addresses 696 and/or selection parameters 698 may be disseminated by one or more of the network proxy servers 640, 662, 664, to network client device 610 and/or network communication device 620 if the network communication device is is configured as a network gateway device.

In embodiments of the present invention, storage device 642 may further include session information for users serviced by the network proxy server. In accordance with the disclosure herein, session information may include cookies, browsing history, cache, user preferences, or other session information. Such session information may further include the previously discussed location indicator and/or location of the network communication device 620, any of the multiple network proxy servers 640, 662, 664, and/or the network coordinating server 660.

Network resource server 650 may include a computing device that serves the network resource 652. The computing device of the network resource server may be operable Co server multiple network resources. Network intermediate device 630 may provide a firewall 632, or other monitoring system operable to block, filter, or redirect communications sent between the network client device 610 and the WAN 670.

Network coordinating server 660 may include a computing device that coordinates operation among the plurality of network proxy servers 640, 662, 664. Network coordinating server 660 may associate a client identifier with a set of one or more proxy addresses corresponding to one or more proxy servers. Network resources may be accessed through the one or more proxy servers by a client device indicated by the client identifier via a wide area network. Network coordinating server 660 may receive an indication from a proxy server that one of the proxy addresses has been blocked by a firewall monitoring communications between another client device and the proxy server. In response to the indication, network coordinating server 660 may update the set of one or more proxy addresses associated with the client identifier to eliminate the proxy address blocked by the firewall. Network coordinating server 660 may send the updated set of one or more proxy addresses associated with the client identifier to the network client device indicated by the client identifier. The updated set of one or more proxy addresses may be sent directly to the network client device or via another proxy server.

In embodiments of the present invention, the network communication device 620 may include a number of vendor identification numbers (VINs). The network communication device 620 may provide one of the VIN numbers that is selected to the operating system 692 of the network client device 610. In an embodiment of the present invention, the network client device 610 that is running instructions obtained from network communication device 620 may provide one of the VIN numbers that is selected to the operating system 692 of the network client device 610. The VIN number may be selected so that the operating system 692 enables the network communication device 620 to communicate with application level software and/or user interfaces 616 of the network client device 610.

In embodiments of the present invention, the network communication device 620 may include an input device, for example, such as a physical keypad. The input device may be operable to enable a user to be authenticated via the network communication device 620. A skilled reader will recognize that authentication may involve various methods, for example, authentication may require a user to enter a password via the input device. In response to successful authentication of the user, the network client device 610 may access information stored at the network communication device 620.

The browser program 686, accessible at the network client device 610 or the network communication device 620, may utilize proxy addresses 680 and/or selection parameters 682 to select one or more of the network proxy servers 640, 660, 662. The network communications may be directed through the selected one or more proxy servers. Such network communications may be directed through the selected one or more proxy servers in a similar manner to that described with reference to network communications method 200, as shown in FIG. 2.

Figure 7:
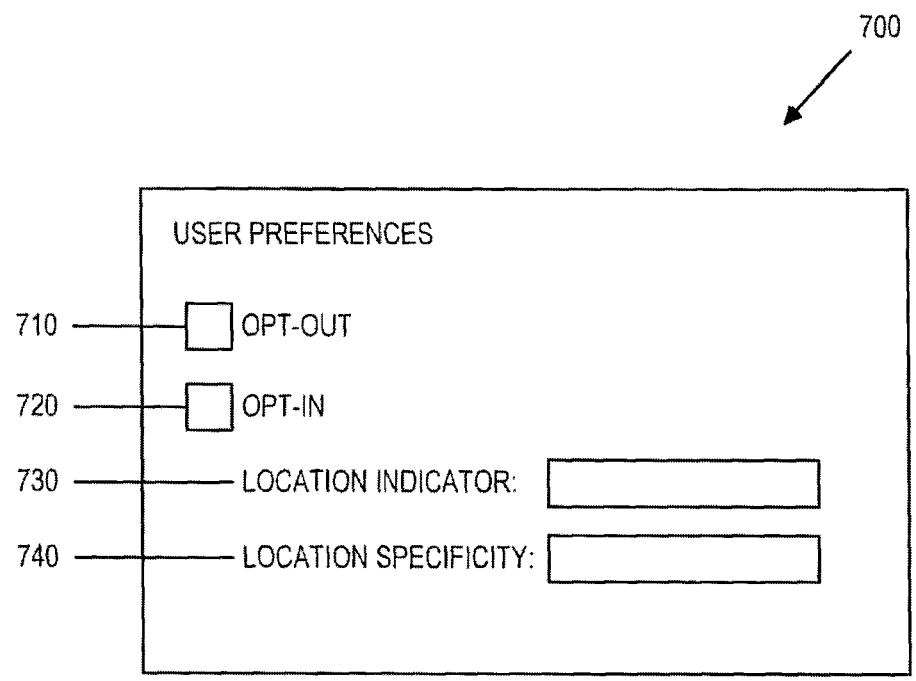
FIG. 7 is a schematic diagram depicting an example graphical user interface according to one disclosed embodiment.

Embodiments of the present invention may incorporate a graphical user interface (GUI) 700, as shown in FIG. 7. The GUI 700 may incorporate a user preference window. The user preference window may be accessible via a menu of a browser program. The GUI may be operable to enable a user to provide input. For example, the input provided by a user may be user input disclosed in reference to the location method 500, as shown in FIG. 5. A skilled reader will recognize that other user input may be provide by a user in accordance with the present invention.

As shown in FIG. 7, the GUI 700 may incorporate an opt-out selector 710 that may be utilized to enable a user to opt-out with respect to proxy server addition and/or modification of location information forwarded to other server devices on behalf of the client device. The GUI may also incorporate an opt-in selector 720 that may be utilized to enable a user to opt-in with respect to proxy server addition and/or modification of location information forwarded to other server devices on behalf of the client device. If the user has opted in by selection of selector 720, the user may further input a location identifier via the location indicator field 730. The location indicator field may be a selector or information field. The user may alternatively or additionally input a location identifier by utilizing the location specificity field 740 to input a location specificity value. The location specificity field may be a selector or information field. The user input may be acknowledged by the system to be parameters. Such parameters may be provided to a proxy server or a coordinating server. The parameters may be utilized by the system to implement policy with respect to how location information for the user and/or the client device is modified by the proxy server.

Figure 8:
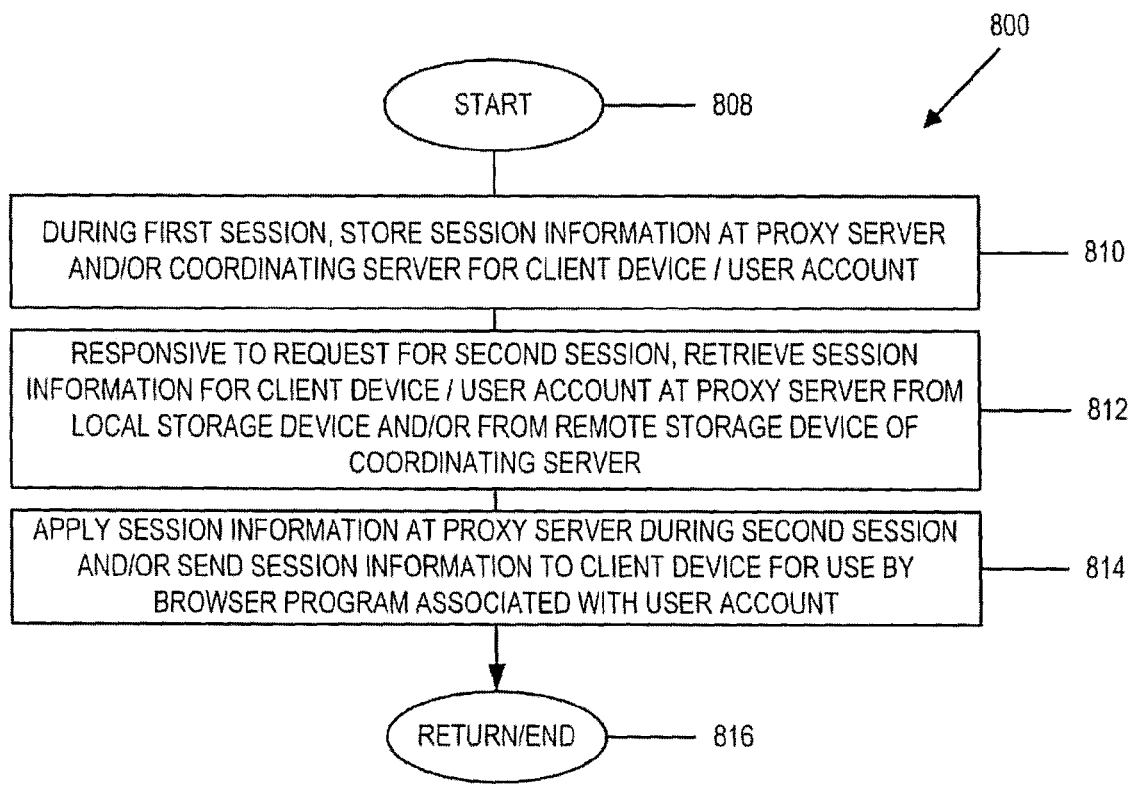
FIG. 8 is a flow diagram depicting a method for a proxy server to maintain session information at a remote location from a client device, portable storage device, and/or network gateway device.

Embodiments of the present invention may incorporate a session method 800, as shown in FIG. 8. The session method 800 may enable a proxy server to maintain session information at a remote location from any of the following: a client device; a portable storage device; and/or a network gateway device.

After a start 808, during a first session, session information may be stored at a proxy server and/or coordinating server for a client device and/or user account 810. The user account may be identified by a particular portable storage device, network gateway device, user authentication (for example, such as username and password combination), or other suitable identifier.

As a next step, in response to a request for a second session, the proxy server may retrieve the session information for the client device and/or user account from a local storage device and/or from a remote storage device of a coordinating server 812.

As a next step, session information may be applied at the proxy server to communications between the client device and a network resource during a second session and/or sending the session information to the client device for use by a browser program associated with the client device and/or user account during the second session 814. In accordance with the present invention disclosed herein, the session information may include any of the following: cookies; cached items; user preferences; a location indicator; a location specificity value; and/or other suitable session information.

As a next step, the session method 800 may either end or otherwise terminate at this point, or may repeat any or all of the steps of the session method. For example, the session method may return to step 810 and repeat steps 810-814 in order one or more times.

in one embodiment of the present invention, when accessing the Internet through a proxy network verification may be provided that an Internet connection is secure. For example, a visual confirmation that a connection is secured may be provided which confirms to a user that their connection is secured by a proxy network provided by a trusted party. A skilled reader will recognize that other means indicating a verification of the security of a connection may be provided to a user.

In one embodiment of the present invention, the following steps may be applied to validate the connection and provide a visual confirmation of the security of the connection to a user. As a first step, a validating website or API may be incorporated in the present invention and a browser application may be connected to said website or API. The validating website or API can be configured so as to be operable to answer queries as to whether or not the request came through a trusted secure proxy network. In one embodiment of the present invention, all requests use HTTPS so that the browser making the request can validate that it is connected to the desired trusted party.

If a visual indicator is incorporated in the present invention this may be used in a browser application user interface to indicate to a user whether or not the connection is secure, and if the connection is made through a desired, trusted party. The visual indicator may be a simple visual indicator located at a search input field in the browser application. The visual indicator may provide an indication to a user as to whether or not the connection is secure though the presentation of a graphical representation that indicates verification, or lack of verification, of a secured connection. The visual indicator may alternatively or additionally undergo a change color to indicate verification, or lack of verification, of a secured connection.

In another embodiment of the present invention, a background process may run in the browser application that will periodically issue queries to the validating website to confirm that requests are traveling through the desired secure channel. Such queries may be issued as required or in accordance with a pre-set schedule. This background process will verify that the system only accepts responses for the desired trusted party. Once the background process outputs the results of a query the system may modify the verification indicator so that a user is made aware of any change in status regarding the verification of security. For example, if the verification indicator is a visual indicator, then the verification indicator may be modified to change the graphic representation and/or the colour of the indicator, as may be appropriate if there has been a change in security status.

In another embodiment of the present invention, the automatic selection of different proxy networks may change the browser connection. A change in the browser connection may trigger an immediate query sent to the validating website in order to confirm that the new connection is secured. Any change in status in the security of the connection is then promptly updated, and any modification in the status may cause a the indicator to change, in accordance with the present invention as disclosed herein.

In another embodiment of the present invention, the validating website can be configured to accept requests from any destination or element of the Internet. While no credentials are required for a client site, clients can validate that a website is a trusted proxy by checking that the SSL certificate provided by the website is valid. Once a client site has verified a website, the client site issues a request for verification. The website, upon receiving the request from a client site, will take the source IP of the request and see if it matches the IP of any valid proxy servers. The website is able to do this because it has access to a backend database that is utilized to validate the IP addresses of valid proxy servers. At a startup point, the verification website can obtain a list of the valid proxy servers and may periodically check for updates to the list of valid proxy servers.

In another embodiment of the present invention, at startup, the browser application performs an initial check to verify the connection. Once the initial check has occurred, the browser application can use a variety of algorithms to determine how frequently it will undertake a re-validation process in order to validate that requests are going through the secure network on an ongoing basis. One possible frequency that may be applied is that a check may be done at the same time as the user clicks or enters a new webpage and/or website. Alternatively, rather than performing a validation when each new webpage and/or website is entered by a user, the system may re-validate that the connection is secure at a regular intervals, for example, such as regular timed intervals, such as every 5 minutes, every 2 minutes, every 10 minutes, or at any other regular intervals in time. A skilled reader will recognize that the system may be set to apply a re-validation process at a variety of intervals (for example, such as regular timed intervals or other intervals) or upon a variety of triggers (for example, such as the user entering a new webpage, or any other activities or triggers). A skilled reader will further recognize that any time interval utilized by the system will be limiting, and may be varied over time. For example, the time interval may be shorter during times where the user is actively moving to different webpages, and longer during periods of inactivity by the user.

Generally, the present system and method may provide an indicator, that may be a visual indicator, in the main browser user interface. The indicator may consistently be available to enable a user to confirm the secure status of the connection at any given time. Such confirmation may be a visual confirmation if the indicator is a visual indicator. The process validation process, or any re-validation process, may occur based on specific times or triggers, for example, such as actions taken by a user, any significant changes in state, the level of user browsing activity, or set timed intervals.

In one embodiment of the present invention, when the browser application needs to work cooperatively with another application there needs to be a way for each application to notify the other if either is going to exit, shutdown, or restart. For example, a browser application may need to work cooperatively with another application if such applications include a launcher application of the present system and method which manages the proxy connections. Generally, each application may monitor the run status of the other application. By utilizing the results of such monitoring each application may identify points when each application should perform an exit, shutdown or restart. A skilled reader will recognize that the results of such monitoring may not be utilized to allow one application to recognize when it should perform an exit, shutdown or restart if the other application supports restarting. An application may support restarting if the browser application may be enabled to restart.

More particularly, the browser application and the launcher may be configured as two different and separate applications. If the browser application and the launcher are configured as two separate applications and the browser application runs in the absence of the launcher application, the browser application will not be able to connect using a secure proxy connection. Most of the time, when the browser closes, it is doing so because the user is closing the program. In such an instance the launcher application can also be closed and the USB key can be secured. However, some features in the browser require the browser to restart. For example, a browser may be required to restart to install an add-on or plug-in module. If features in the browser require the browser to restart, the launcher application may have no ability to recognize the intent of the browser application when it shuts down. For example, the launcher application may have no ability to recognize whether the intent of the browser application is to restart or to close. If the browser application intends to restart, the launcher application should stay open so that when the browser application restarts, the launcher application is able to connect.

To address this issue, in one embodiment of the present invention, before the browser application exits, if the intent of the browser application relating to the exit is that the exit is to be a step in the process of an immediate restart, the browser application is configured to write a status file to a file system. The writing of a status file to a file system by the browser application allows any monitoring applications, for example, such as of the launcher application, to identify that an immediate restart is occurring. This allows any monitoring application to recognize that an immediate restart is occurring upon the exit, rather than a normal exit. The intention supporting the exit is generally determined by the user. In embodiments of the present invention, when the browser application restarts, the browser application will clean-up the status file so that the next time the browser application exits a normal exit may occur, if the intention of the browser application is not to perform an immediate restart.

It will be appreciated by those skilled in the art that other variations of the embodiments described herein may also be practiced without departing from the scope of the invention.

The invention claimed is:

1. A method performed by a network communication system, the network communication system including a client device and a server system having a plurality of servers, the method comprising:

receiving session information at a first server of the server system from a client device via a wide area network, the session information indicating one or more user selections with respect to a location identifying preference of a user of the client device;

storing the session information received from the client device in a user account at a storage device of the server system;

receiving, at the client device, an encrypted first message indicating one or more proxy addresses and one or more selection parameters from the server system over the wide area network, each proxy address corresponding to a respective proxy server of the server system;

decrypting, at the client device, the encrypted first message to obtain a decrypted first message;

storing the one or more proxy addresses and one or more selection parameters in a storage device of the client device;

selecting, at the client device, a proxy server from the one or more proxy addresses stored in the storage device of the client device using the one or more selection parameters stored in the storage device of the client device;

initiating authentication of a user of the client device with the selected proxy server, said authentication enabling the selected proxy server to retrieve the session information from the user account;

sending, from the client device, an encrypted second message to the selected proxy server indicating a destination third-party network server, the encrypted second message including a search query message;

receiving the encrypted second message including the search query message at the selected proxy server from the client device via the wide area network, the search query message indicating a destination search service of a third-party network server;

processing the search query message at the selected proxy server or the server system according to user selections stored in and retrieved from the user account to obtain a modified search query message in which:

responsive to a first user selection of the user selections, modifying the search query message at the selected proxy server or the server system according to a first policy in which at least a geographic location specificity of the client device is altered within the modified search query message, and responsive to a second user selection of the user selections, modifying the search query message at the selected proxy server or the server system according to a second policy in which at least a geographic location of the client device is altered within the modified search query message to indicate a fictitious geographic location of the client device; and sending the modified search query message from the selected proxy server to the destination search service of the third-party network server via the wide area network.

2. The method of claim 1, wherein the first server that receives the session information is a proxy server of the server system, and wherein storing the session information at the storage device of the server system includes storing the session information at a local storage device of the proxy server and/or storing the session information in a remote storage device of another server of the server system.

3. The method of claim 1, wherein the first server that receives the session information is a different server than the selected proxy server, and wherein storing the session information at the storage device of the server system includes storing the session information at a remote storage device relative to the selected proxy server, and wherein retrieving the session information includes transmitting the session information from another server of the server system to the selected proxy server for use in processing the search query message.

4. The method of claim 1, further comprising:
receiving a response message at the selected proxy server from the destination search service of the third-party network server via the wide area network; and
forwarding the response messages from the selected proxy server to the client device via the wide area network.

5. The method of claim 4, further comprising:
processing the search query message at the proxy server or the server system by decrypting the encrypted second message prior to sending the modified search query to the destination search service; and
encrypting, at the proxy server or the server system, the response message received from the destination search service prior to forwarding the response message from the proxy server to the client device.

6. The method of claim 1, wherein the first user selection indicates a location specificity value to be applied by the proxy server or the server system to the geographic location of the client device and/or indicates a user selection of the first policy.

7. The method of claim 6, wherein the location specificity value includes at least three levels of location specificity having different breadth relative to each other that are selectable by the user to be applied at the proxy server or the server system to the geographic location of the client device.

8. The method of claim 1, wherein the second user selection indicates the fictitious geographic location to be applied by the proxy server or the server system and/or wherein the second user selection indicates a user selection of the second policy.

9. The method of claim 1, further comprising:
sending the encrypted first message from the server system to the client device via the wide area network.

10. The method of claim 9, wherein the one or more selection parameters of the encrypted first message are utilized by a selection algorithm of a browser program operating at the client device to select the proxy server.

11. The method of claim 10, wherein the one or more user selections and the search query message are initiated at the client device by the user via a graphical user interface containing one or more respective selectors presented by the browser program.

12. The method of claim 1, further comprising:
receiving an indication of an update to the one or more proxy addresses and/or one or more selection parameters at the selected proxy server from another server of the server system; and
responsive to the indication of the update, sending an updated set of one or more proxy addresses and/or one or more updated selection parameters from the selected proxy server to the client device to augment the one or more proxy addresses and/or one or more selection parameters previously received by the client device; and
wherein the updated set of one or more proxy addresses and/or one or more updated selection parameters are utilized by a selection algorithm of a browser program operating at the client device to select another proxy server of the server system.

13. The method of claim 1, further comprising:
authenticating the client device at the server system prior to storing the session information received from the client device in the user account and prior to processing the search query message.

14. A network communication system, comprising:
a client device having a processor and a storage device that includes a program executable by the processor of the client device to:
receive a first set of one or more encrypted messages indicating one or more proxy addresses and one or more selection parameters over a wide area network, each proxy address corresponding to a respective proxy server of a server system,
decrypt the first set of one or more encrypted messages to obtain a first set of one or more decrypted messages,
store the one or more proxy addresses and one or more selection parameters in the storage device of the client device,
select a proxy server from the one or more proxy addresses stored in the storage device of the client device using the one or more selection parameters stored in the storage device of the client device,
initiate authentication of a user of the client device with the selected proxy server, the authentication enabling the selected proxy server to retrieve session information from a user account, the session information indicating one or more user selections with respect to a location identifying preference of the user of the client device, and
send an encrypted second message to the selected proxy server indicating a destination third-party network server; and
the server system including a coordinating server and a plurality of proxy servers including the selected proxy server in communication with the coordinating server via a communications network in which the selected proxy server includes instructions stored thereon executable by the selected-proxy server to:
authenticate the client device communicating with selected proxy server via the wide area network,
receive session information from the client device via the wide area network after said authentication
send the session information received from the client device to the coordinating server for storage in a user account at a remote storage device of the coordinating server,
receive the encrypted second message from the client device via the wide area network after said authentication or a subsequent authentication of the client device,
decrypt the encrypted second message to obtain a decrypted second message,
process the decrypted second message according to the one or more user selections stored in and retrieved from the user account at the remote storage device of the coordinating server or from a local storage device of selected proxy server to modify the decrypted second message in which:
responsive to a first user selection, the decrypted second message is modified according to a first policy in which at least a geographic location specificity of the client device is altered within the first modified message, and
responsive to a second user selection, the decrypted second message is modified according to a second policy in which at least a geographic location of the client device is altered within the modified message to indicate a fictitious geographic location of the client device; and
send the modified message to the third-party network server via the wide area network.

15. The network communication system of claim 14, wherein the first user selection indicates a location specificity value to be applied by the selected proxy server to the geographic location of the client device and/or indicates a user selection of the first policy, the location specificity value including at least three levels of location specificity having different breadth relative to each other that are selectable by the user to be applied at the selected proxy server to the geographic location of the client device.

16. The network communication system of claim 15, wherein the second user selection indicates the fictitious geographic location to be applied by the selected proxy server and/or indicates a user selection of the second policy.

17. The network communication system of claim 16, wherein the selected proxy server further includes instructions executable by the selected proxy server to:
receive one or more proxy addresses and one or more selection parameters from the coordinating server; and
send the one or more proxy addresses and/or one or more selection parameters to an authenticated client device to be utilized by a selection algorithm of a browser program operating at that authenticated client device to select a different proxy server of the plurality of proxy servers through which that authenticated client device communicates with third-party network servers.

18. A network communication system, comprising:
a client device having a processor and a storage device that includes a program executable by the processor to:
receive an encrypted first message indicating one or more proxy addresses and one or more selection parameters from a server device over a wide area network, each proxy address corresponding to a respective proxy server of a server system of which the server device is a member;
decrypt the encrypted first message to obtain a decrypted first message;
store the one or more proxy addresses and one or more selection parameters in the storage device of the client device;
select a proxy server from the one or more proxy addresses stored in the storage device using the one or more selection parameters stored in the storage device;
initiate authentication of a user of the client device with the selected proxy server, the authentication enabling the proxy server to retrieve session information from a user account, the session information indicating one or more user selections with respect to a location identifying preference of the user of the client device;
send an encrypted second message to the selected proxy server indicating a destination third-party network server in which the selected proxy server processes the second message according to the one or more user selections retrieved from the user account to modify the second message in which:
responsive to a first user selection of the one or more user selections, the second message is modified according to a first policy in which at least a geographic location specificity of the client device is altered within the modified second message forwarded by the selected proxy server to the destination third-party network server, and responsive to a second user selection of the one or more user selections, the second message is modified according to a second policy in which at least a geographic location of the client device is altered within the modified second message to indicate a fictitious geographic location of the client device within the modified second message forwarded by the selected proxy server to the destination third-party network server.

19. The network communication system of claim 18, wherein the program is further executable by the processor to:

initiate authentication of the user of the client device with the server system via the wide area network;

present a graphical user interface at the client device after the authentication with the server system, the graphical user interface including one or more selectors corresponding to the one or more user selections;

receive a user input directed at the one or more selectors;

send the user input to the server system via the wide area network as a third message indicating the one or more user selections for storage in the user account.

20. The network communication system of claim 18, wherein the program includes a browser program and additional software components including one or more of a system driver or plug-in for the browser program.

\* \* \* \* \*